United States Patent [19]
Chen

[11] Patent Number: 5,701,478
[45] Date of Patent: Dec. 23, 1997

[54] COMPUTER CONTROL DEVICE FOR USE WITH A TV GAME MACHINE ALLOWING BIOS PROGRAM EXECUTION FROM TV GAME PROCESSOR ADDRESS SPACE

[75] Inventor: Yi-Rong Chen, Taipei, Taiwan

[73] Assignee: Brasil International (Taiwan) Corp., Taipei, Taiwan

[21] Appl. No.: 433,747

[22] Filed: May 4, 1995

[51] Int. Cl.⁶ ........................................ G06F 9/06
[52] U.S. Cl. .................. 395/652; 395/402; 395/410; 395/497.01
[58] Field of Search ................... 395/651, 652, 395/653, 401, 402, 410, 497.01

[56] References Cited

U.S. PATENT DOCUMENTS

| | | | |
|---|---|---|---|
| 5,136,713 | 8/1992 | Bealkowski et al. | 395/652 |
| 5,210,875 | 5/1993 | Bealkowski et al. | 395/652 |
| 5,355,489 | 10/1994 | Bealkowski et al. | 395/652 |
| 5,546,585 | 8/1996 | Soga | 395/652 |
| 5,564,054 | 10/1996 | Bramnick et al. | 395/652 |

*Primary Examiner*—Kevin A. Kriess
*Attorney, Agent, or Firm*—Jacobson, Price, Holman & Stern, PLLC

[57] ABSTRACT

A computer control device including a TV game machine (for example: SEGA 16 Bit vedio game Mega Drive/Genesis), and a computer control main unit connected to the card slot on the TV game machine, wherein the computer control main unit has a first ASIC, a second ASIC and a plurality of interface circuits respectively connected to peripheral equipment (such as MODEM, CD-ROM, printer, etc.), SRAM, DRAM and ROM to use the signal from the card slot on the TV game machine and to decode the address using the first ASIC, permitting the BIOS program in the ROM to be loaded onto a free address space in the TV game machine and permitting the internal program of the TV game machine to jump to the address space to execute the BIOS program.

16 Claims, 7 Drawing Sheets

COMPUTER CONTROL DEVICE FOR USE WITH A TV GAME MACHINE ALLOWING BIOS PROGRAM EXECUTION FROM TV GAME PROCESSOR ADDRESS SPACE

BACKGROUND OF THE INVENTION

The present invention relates to a computer control device which comprises a TV game machine (for example: SEGA 16 Bit video game Mega Drive/Genesis), and a computer control main unit connected to the card slot on the TV game player, wherein the computer control main unit has a first ASIC, a second ASIC and a plurality of interface circuits respectively connected to peripheral equipment (such as a MODEM, CD-ROM, keyboard printer, etc.), SRAM, DRAM and ROM to use the signal from the card slot on the TV game machine and to decode the address code using the ASIC, permitting the BIOS program in the ROM to be loaded onto free address space in the TV game machine and permitting the internal program of the TV game machine to trip to the address space to execute the BIOS program.

Regular TV game machines commonly have a memory (such as ROM) on their respective circuit board to keep the software. Program designers write the software according to the hardware structure for controlling the operation, i.e. all control signals can be obtained from the card slot on the circuit board and transmitted through data, address and control lines and then executed through the control program of the card, so that the game machine can control the sound, the operation of the joystick, the image, and the execution of the content of the game software. However, because regular TV game machines are specifically designed for a single purpose (executing the game software program), they can only be mounted with a game card and operated to play the game through a joystick, i.e., they cannot be used with peripheral equipment (such as a diskdrive, printer, keyboard, etc.).

Referring to FIG. 1, the available address space in the memory of the microprocessor (Motorola 68000) of a regular TV game machine is illustrated. The address for the game software is in the space within the section between 000000-3FFFFFH. Therefore, when power supply is turned on, the execution is started from the initial address of 000004-000007H in 000000-3FFFFFH. If one is to use a TV game machine with the computer peripheral equipment, the BIOS program of the ROM must be allocated in this section for execution. However, because this section is designed for the ROM of the game card, a data conflict will occur. The control method shown in FIG. 8 eliminates this problem.

Referring to FIG. 2, when a D-type flip-flop 150 and an AND Gate 160 and other components are installed, the microprocessor is allowed to select the game card or the computer peripheral equipment alternatively without causing a data conflict. However, this arrangement allows one to use one function only, therefore the TV game machine and the computer peripheral equipment cannot be simultaneously operated. In order to enhance the peripheral control capability of the BIOS program of the ROM for executing word processing software, educational software, etc., this method is not practical.

SUMMARY OF THE INVENTION

The present invention has been accomplished in view of the foregoing circumstances in view. It is the principal object of the present invention to provide a computer control device for use with a TV game machine which allows the machine to control the TV game player and to operate a variety of peripheral equipment. According to the preferred embodiment of the present invention, the computer control device comprises a TV game machine and a computer control main unit inserted in the card slot on the TV game machine to pick up the signal from the card slot on the TV game machine and to decode the address code using a first ASIC thereof. Therefore, the computer control main unit can jump to the unused address space (800000-9FFFFFH) to allocate the necessary addresses for the BIOS program of the ROM and other peripheral equipment in the unused address space so as to further execute the BIOS program of the ROM.

DETAILED DESCRIPTION OF THE PREFERRED EMBODIMENT

Figure 3:
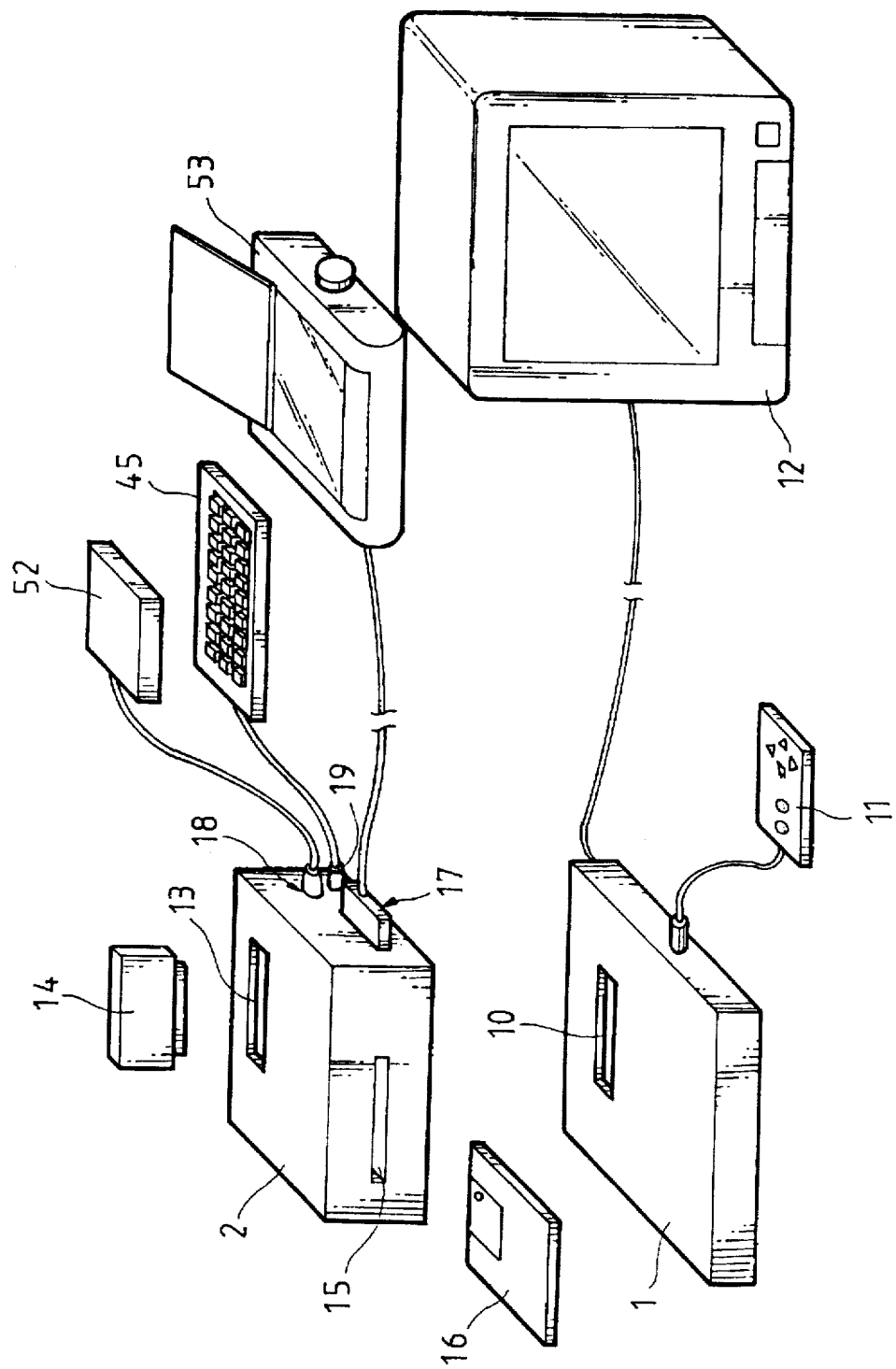
FIG. 3 shows a computer control TV game system arranged according to the present invention.

Referring to FIG. 3, the present invention comprises a TV Game machine 1, and a Computer Control Main Unit 2. The TV Game machine 1 has a Slot 10 at a suitable location for the connection of the plug connector (not shown) on the bottom side of the Computer Control Main Unit 2. Peripheral equipment such as a Joystick 11, a Monitor 12, etc., are respectively connected to the TV Game machine 1. The Computer Control Main Unit 2 comprises a card slot 13 for loading a TV Game Card 14, a FDD (Floppy Diskdrive 15 mounted on the inside for loading a Floppy Disk 16 for reading and writing, a Printer Slot 17 and a MODEM Slot 18 and a Keyboard Slot 19 respectively made on the periphery for connecting a Printer 53, a MODEM 52, and a Keyboard 45 respectively.

Figure 4:
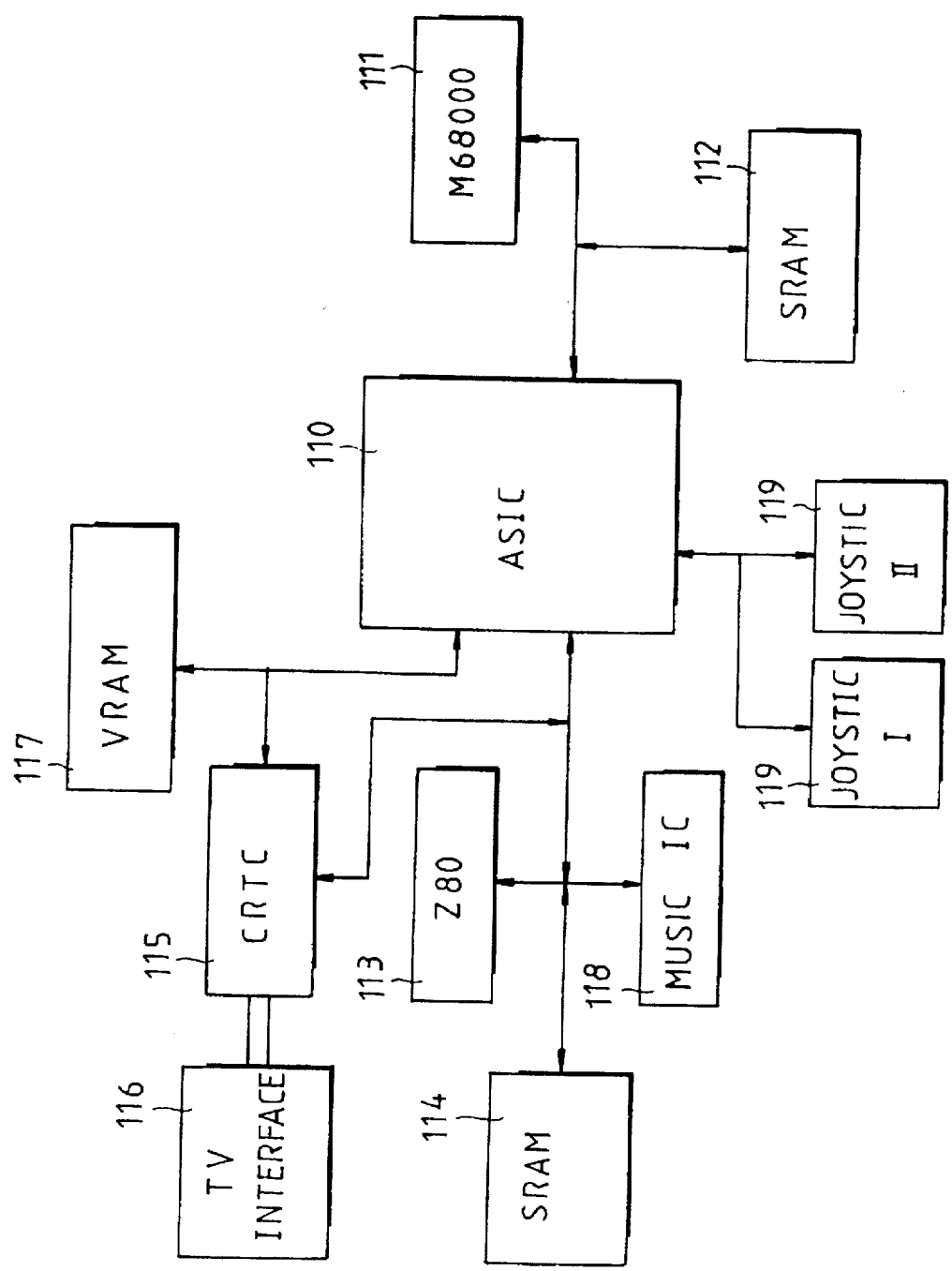
FIG. 4 is a circuit block diagram of the TV game machine according to the present invention.

Referring to FIG. 4, the circuit structure of the TV Game machine 1 comprises an ASIC (Application Special IC) Chip 110, a First microprocessor (for example: Motorola 68000) 111, a First SRAM (Static Random Access Memory) 112, a Second Microprocessor (for example: Z80) 113, a Second SRAM (Static Random Access Memory) 114, a CRTC (Cathode Ray Tube Controller) 115, a TV Interface 116, a VRAM (Video Random Access Memory) 117, a Sound IC 118, and Joysticks 119. (The design of the circuit layout of the TV Game machine 1 is not within the scope of the claims of the present invention, therefore it is not described in detail).

Figure 1:
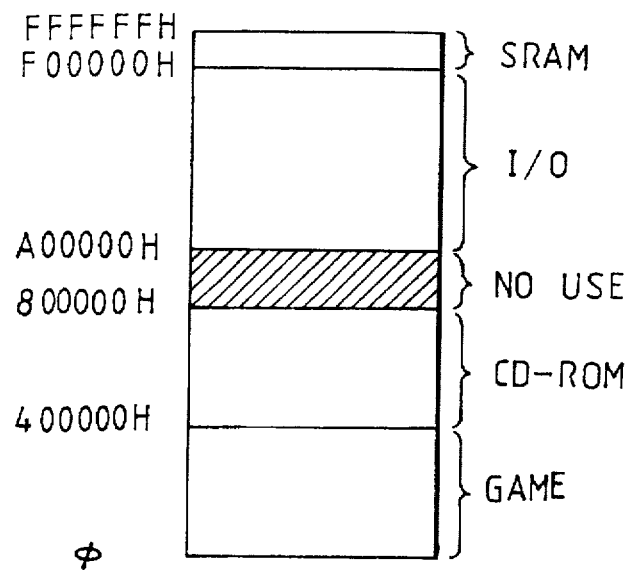
FIG. 1 shows the memory map of a regular TV game machine.
Figure 2:
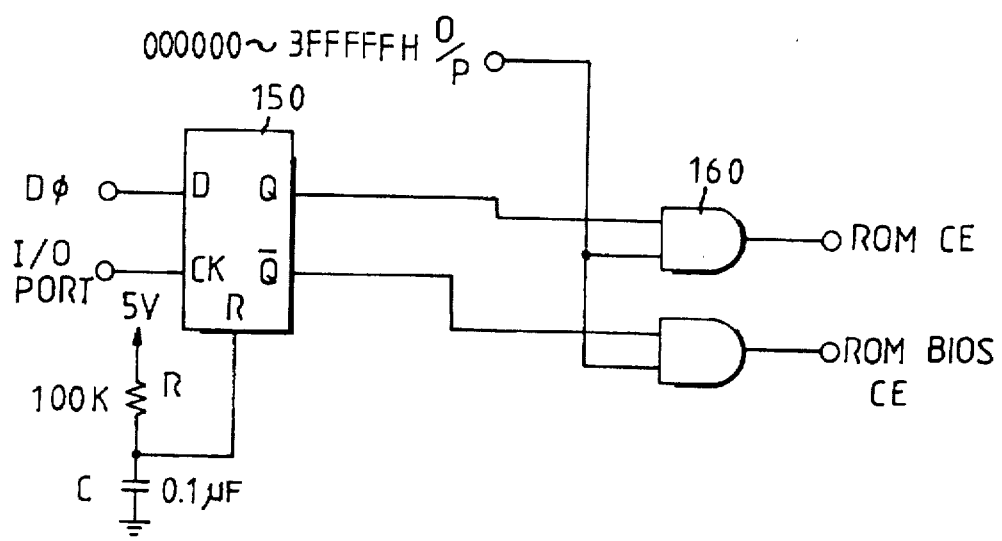
FIG. 2 is a prior art circuit diagram of the TV game machine used in the present invention.

FIG. 1 shows the memory map of the First microprocessor (Motorola 68000) of the TV Game machine 1. As illustrated, the software of every kind of TV game is allocated within the section between 000000-3FFFFFH, therefore the software of every kind of TV game will start the execution from the initial address 000004-000007H. The section within 800000-9FFFFFH is the unused address space of the microprocessor (Motorola 68000) 111.

Figure 5:
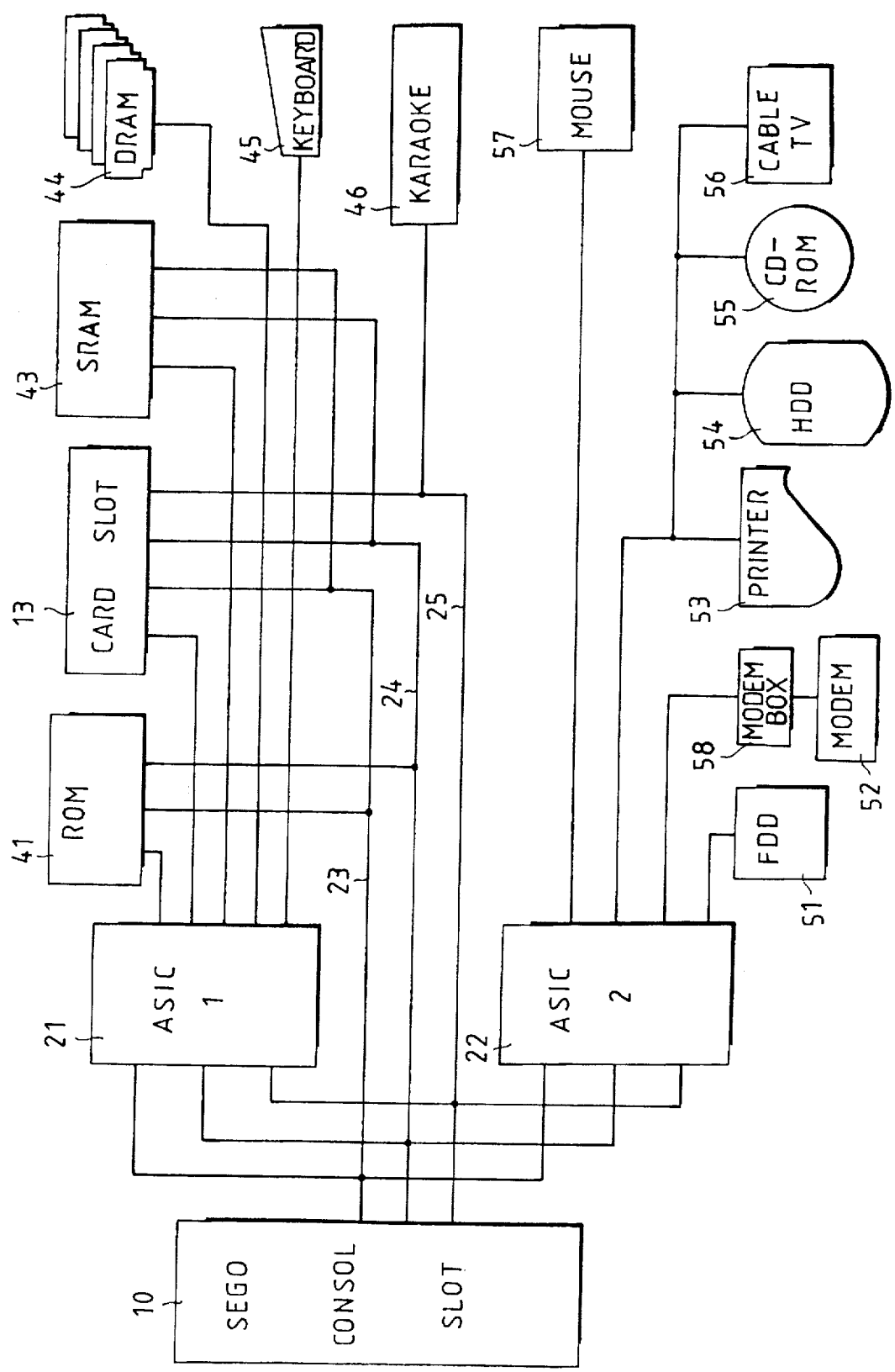
FIG. 5 is a circuit block diagram of the computer control main unit according to the present invention.
Figure 6:
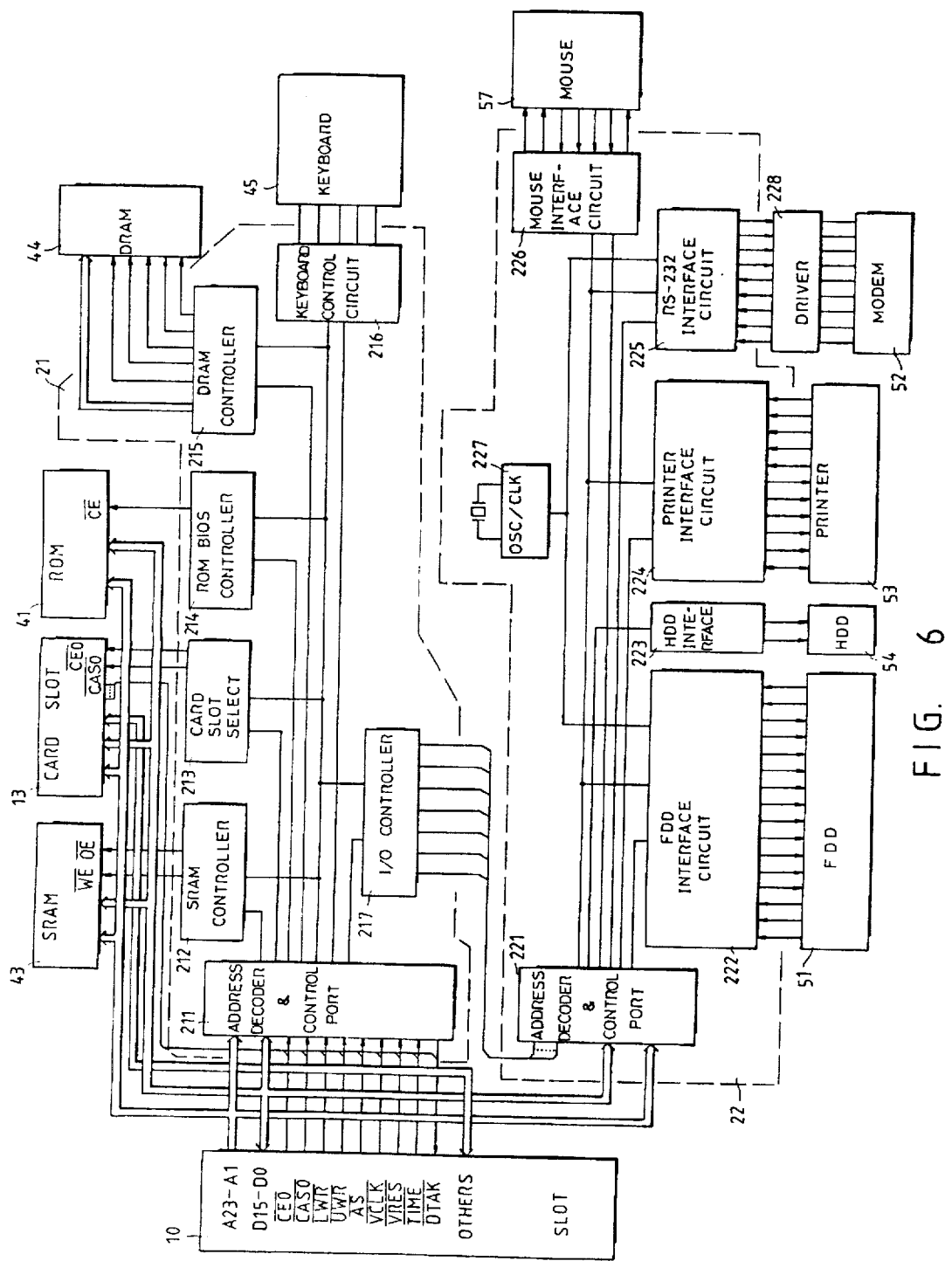
FIG. 6 is a circuit diagram of the computer control main unit according to the present invention.

Referring to FIGS. 5 and 6, the circuit structure of the computer control main unit 2 comprises a First ASIC Chip 21, a Second ASIC Chip 22, a ROM (Read Only Memory) 41, a SRAM 43, a DRAM (Dynamic Random Access Memory) 44, a card slot 13, and other connectors for peripheral equipment such as IBM PC AT/XT Keyboard 45, KARAOKE 46, FDD (Floppy Diskdrive) 51, MODEM 52, Printer 53, HDD (Hard Diskdrive) 54, CD-ROM 55, Cable TV 56, Mouse 57, and MODEM Box 58. The Slot 10 of the TV game machine 1 is connected to the First ASIC Chip 21, the Second ASIC Chip 22, the ROM 41, the card slot 13, and the SRAM 43 by an Address Bus and a Data Bus, and connected to the First ASIC Chip 21,the Second ASIC Chip 22, the card slot 13, and the KARAOKE slot 46 by a Control Bus. The address and control output port of the First ASIC Chip 21 is respectively connected to the control pin of the ROM 41, the control pin of the card slot 13, the control pin of the SRAM 43, the address and control pin of the DRAM 44, and the IBM AT/XT Keyboard 45. The address and control output port of the Second ASIC Chip 22 is respectively connected by respective interface circuits to the FDD 51, the MODEM Box 58, and the MOUSE 57, and connected in parallel to the PRINTER 53, the HDD 54, THE CD-ROM 55, and the Cable TV 56. The MODEM Box 58 is connected with a MODEM 52.

Referring to FIG. 6, the First ASIC Chip 21 comprises an Address Decoder & Control Port 211, a SRAM Controller 212, a card slot Select 213, a ROM BIOS Controller 214, a DRAM Controller 215, a Keyboard Control Circuit 216, and an I/O Controller 217. The Controllers 212, 214, 215, and 217, the Keyboard Control Circuit 216 and the card slot Select 213 are respectively connected to the Address Decoder & Control Port 211. The First ASIC Chip 21 is connected to the input port of the Second ASIC Chip 22 by the I/O Controller 217 and provides a control signal to the ASIC Chip 221 through the I/O Controller 217. The Second ASIC Chip 22 comprises an Address Decoder & Control Port 221, a Floppy Diskdrive (FDD) Interface Circuit 222, a Hard Diskdrive (HDD) Interface Circuit 223, a Printer Interface Circuit 224, a RS-232 Interface Circuit 225, a Mouse Interface circuit 226, and a Clock Generator OSC/CLK 227. The input of the Interface Circuits 222, 223,224, 225, and 226 are respectively connected to the address output port of the Address Decoder & Control Port 221, the OSC/CLK 227 is connected to the FDD Interface Circuit 222 and the RS-232 Interface Circuit 225 to provide the necessary timing and pulse. The RS-232 Interface Circuit 225 is connected to the MODEM 52 through a Driver 228. The FDD Interface Circuit 222 is connected with a FDD (Floppy Diskdrive) 51. The HDD Interface Circuit 223 is connected with a HDD (Hard Diskdrive) 54. The Printer Interface Circuit 224 is connected with a Printer 53. The Mouse Interface Circuit 226 is connected with a Mouse 57.

Figure 7:
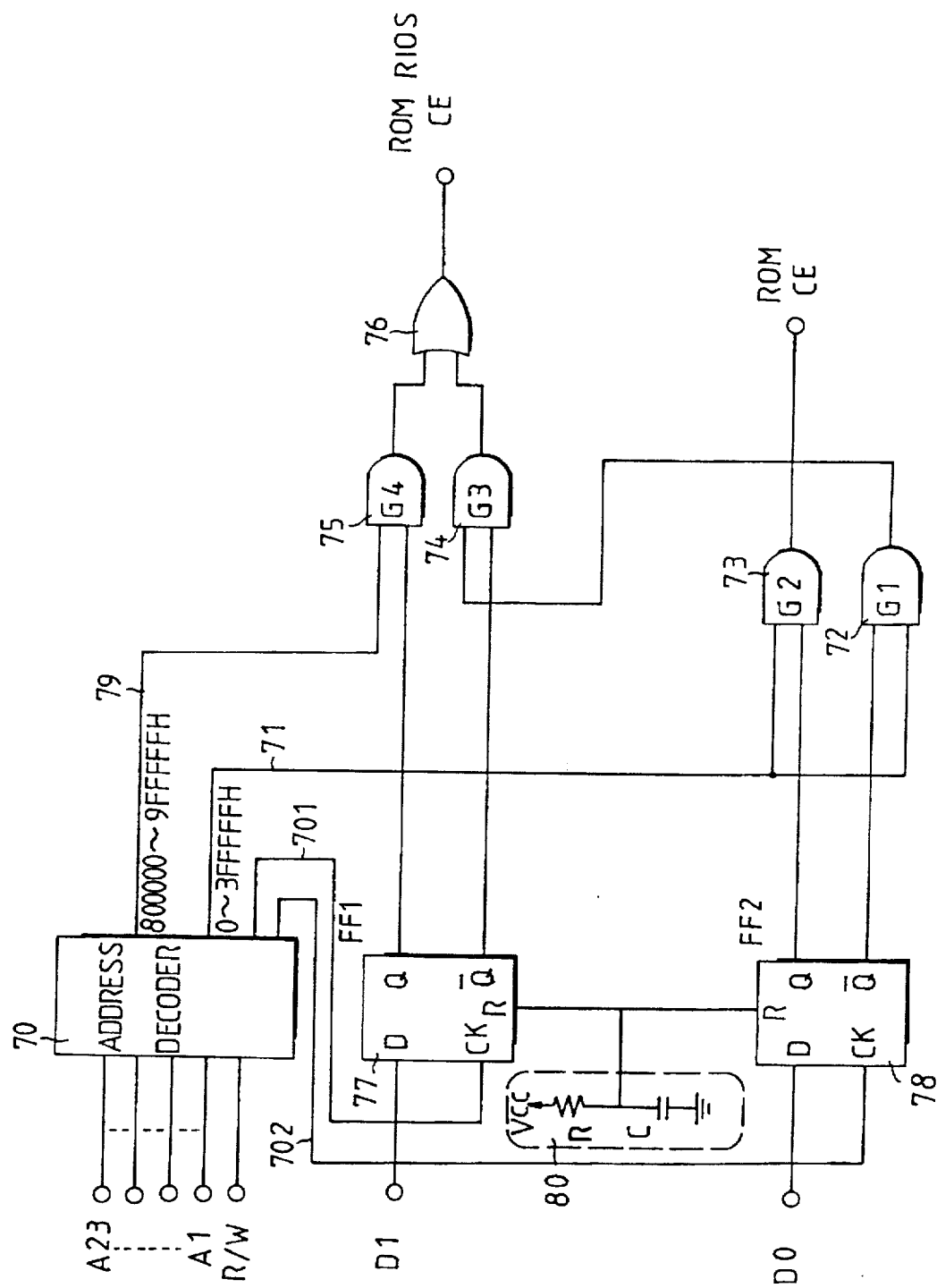
FIG. 7 is a circuit diagram of the first ASIC and the connection between the ROM and the control pin of the TV game machine according to the present invention.

FIG. 7 shows the connection of the address and control output port of the First ASIC Chip 21 to the ROM 41 and the card slot 13. The Address Decoder 70 is connected to the slot 10 on the TV Game machine 1. The output of addresses 000000-3FFFFFH 71 of the Address Decoder 70 is connected to the control pin (CE) of the card slot 13 by an AND Gate 73, and connected to the input of an AND Gate 74 by an AND Gate 72. The output of the AND Gate 74 is connected to one input of an OR Gate 76. The other input of the OR Gate 76 is connected to the output of an AND Gate 75. One input of the AND Gate 75 is connected to the address 800000-9FFFFFH 79 of the Address Decoder 70. The inputs of the AND Gates 74 and 75 are respectively connected to the outputs of a D-type Flip-Flop 77. The D-type Flip-Flop 77 has one end (CK) connected to the output 701 of the Address Decoder 70. The other inputs input of the AND Gates 72 and 73 are respectively connected to the output of a D-type Flip-Flop 78. The D-type Flip-Flop 78 has one end (CK) connected to the other output 702 of the Address Decoder 70. The Resets of the D-type Flip-Flops 77 and 78 are connected together and then to a Power Supply VCC through a circuit 80, which is comprised of a resistor R and a capacitor C. The other ends (D) of the input of the D-type Flips-Flops 77 and 78 are respectively connected to the Slot 10. Furthermore, the output port of the OR Gate 76 is connected to the control pin (CE) of the ROM 41.

When Power Supply Vcc is turned on, the D-type Flip-Flops 77 and 78 are reset by the circuit 80, therefore AND Gates 73 and 75 do no work, and AND Gates 72 and 74 are turned on, causing the OR Gate 76 to operate. Therefore the microprocessor of the TV Game machine 1 enters the BIOS program of the ROM to execute the program. When the microprocessor of the TV Game machine 1 enters the BIOS program of the ROM 41, it starts the execution through its internal program (as the internal program is filed for a copyright, it is not described in detail herein), to let the BIOS program of the ROM 41 be loaded onto the SRAM 112 of the TV Game machine 1 (whose address is kept within F00000-FFFFFFH), and the internal program trip to this address space for execution, so that the BIOS program of the ROM 41 can be shifted from the address space 000000-3FFFFFH to the address space 800000-9FFFFFH, and the BIOS program of the ROM 41 and the addresses of all peripheral equipment can be allocated in this address space. The designed BIOS program which is stored in the SRAM 112 is then driven into the address space 800000-9FFFFFH to start execution. By executing of the BIOS program of the ROM 41 of the Computer Control Main Unit 2 to match with the internal members of the TV Game machine 1, the Computer Control Main Unit 2 is controlled to drive the peripheral equipment.

Figure 8:
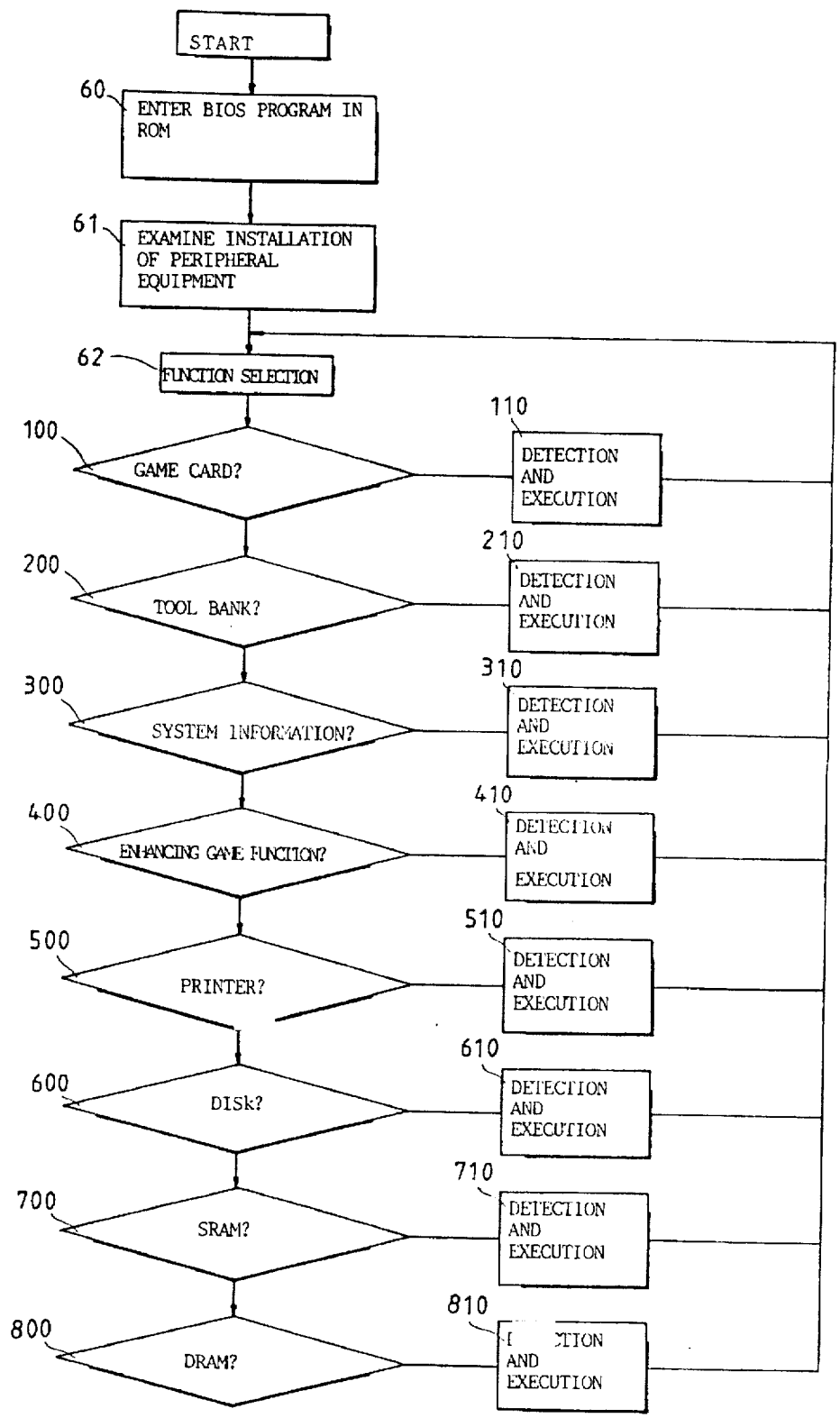
FIG. 8 is an operational flow chart according to the present invention.

FIG. 8 is a program control flow chart of the Computer Control Main Unit 2. When started, it proceeds to step 60 to enter the BIOS program of the ROM 41 of the Computer Control Main Unit 2, then to step 60 to check the installation of the peripheral equipment such as the FDD, Card, Printer, Keyboard. If the peripheral equipment are all normal, the program immediately proceeds to step 62 to select the function and execute the selected function, then step 100 to judge if the Card is selected or not. If the Card is selected, the program immediately proceeds to step 110 to execute the internal program of the Card and the DRAM and to store the data of the Card to Disk or DRAM. If the detection is not finished, the execution is continued. If the detection is finished, it immediately returns to step 62 to select the function and execute the selected function. If the Card is not selected, it immediately proceeds to step 200 to judge if the Tool Bank is selected. If the Tool Bank is selected, the program immediately proceeds to step 210 to format the disk or to use the functions of common computer commands (such as DIR, DELETE, RENAME, CHKDSK) step 210. If the detection is not finished, the execution is continued; if the detection is finished, it immediately returns to step 62 to select the function and execute the selected function. If the Tool Bank is not selected, the program immediately proceeds to step 300 to judge if System Information is selected. If System Information is selected, the program immediately proceeds to step 310 to detect and show the functions of the system (such as DRAM size, BIOS edition code, SRAM installation, etc.). If the detection is finished, the program immediately returns to step 62. If System Information is not selected, the program immediately proceeds to step 400 to judge if the Enhancing Game Function is selected. If the Enhancing Game Function is selected, the program immediately proceeds to step 410 to input different codes subject to different game software so as to enhance the function. If Enhancing Game Function is not selected, the program immediately proceeds to step 500 to judge if the Printer is selected. If the Printer is selected, the program immediately proceeds to step 510 to drive the Printer, causing it to print out data. If the Printer is not connected, it continues the detection or returns to step 62. If the Printer is not selected, the program immediately proceeds to step 600 to judge if the Disk is selected. If the Disk is selected, the program immediately proceeds to step 610 to execute disk operation functions (such as DIR, RENAME, COPY, DISKCOPY). If the disk operation functions are not executed, the program continues the detection or returns to step 62. If the Disk is not selected, the program immediately proceeds to step 700 to judge if SRAM is selected. If SRAM is selected, the program immediately proceeds to step 710 to store the content of the disk or the content of the SRAM of the game card content to the SRAM of the computer control main unit, or to store the data of the SRAM of the computer control main unit to the SRAM of the game card or the disk 710. If the detection is not finished, the execution is continued. If the detection is finished, the program immediately returns to step 62. If the SRAM is not selected, the program immediately proceeds to step 800 to judge the DRAM is selected. If the DRAM is selected, it immediately proceeds to step 810 to modify the data in the DRAM. If the detection is not finished, the execution is continued. If the detection is finished, the program immediately returns to step 62.

Furthermore, the circuit of the TV Game machine, the circuit Computer Control Main unit, the Keyboard, . . . , can be connected integrally to achieve direct connection of the related peripheral equipment; the first ASIC and the second ASIC can be made in a single chip for the connection of the related peripheral equipment.

It is to be understood that the drawings are designed for purposes of illustration only, and are not intended as a definition of the limits and scope of the invention disclosed.

We claim:

1. A computer control device for use with a TV game machine, and comprising a computer control main unit, wherein:

said TV game machine comprises a circuit board on the inside, and a slot on the outside for the connection of said computer control main unit, said circuit board comprising at least one microprocessor and at least one SRAM;

said computer control main unit comprises at least one ASIC, said at least one ASIC being respectively connected to the slot on said TV game machine by an address bus, a data bus, and a control bus, and respectively connected to said computer control main unit by an address bus and a data bus;

said computer control main unit uses the bus signal of the microprocessor of said TV game machine and through the address decoding by the switching circuit of said at least one ASIC to let the BIOS program in said ROM be loaded to an address space in the at least one SRAM of said TV game machine and to let the internal program of the microprocessor of said TV game machine trip to said address space to execute the BIOS program, then to let the BIOS program of said ROM shift a first address space to a second address space by means of the execution of said switching circuit so as to let the addresses required for the BIOS program of said ROM and connected peripheral equipment be allocated in said second address space, and then to let the stored BIOS program enter said second address space to proceed the execution, so as to operate said computer control main unit by means of the execution of the BIOS program and the internal members of said TV game machine.

2. The Computer control device for use with a TV game machine of claim 1 wherein said at least one ASIC comprises a first ASIC and a second ASIC, said first ASIC comprising an address decoder and control port, a SRAM controller, a card slot select, a ROM BIOS controller, a DRAM controller, a keyboard control circuit, and an I/O controller, said SRAM controller, said ROM BIOS controller, said DRAM controller, said I/O controller, said keyboard control circuit and said card slot select being respectively connected to the address decoder output of said address decoder & control port, the output of said I/O controller being connected to the input of said second ASIC to it with a control signal.

3. The Computer control device for use with a TV game machine of claim 2 wherein said first ASIC comprises a switching circuit, said switching circuit comprising an address decoder, a first D-type flip-flop, a second D-type flip-flop, a first AND gate, a second AND gate, a third AND gate, a fourth AND gate, an OR gate, and a trigger circuit, the input of said address decoder being connected to the output of the slot on said TV game machine to decode the address section of the address bus of said TV game machine and to output a first address space and a second address space, the address of the first address space being connected to the control pin (CE) of the card slot through said second AND gate and the input of said first AND gate and said third AND gate, the output of said third AND gate being connected to one end of the input of said OR gate, the other end of the input of said OR gate being connected to the output of said fourth AND gate, one end of the input of said fourth AND gate being connected to the second address of the output of said address decoder the other ends of the input of said third and fourth AND gates being respectively connected to the output terminal of said first D-type flip-flop, the input terminal (CLK) of said first D-type flip-flop being connected to one output of said address decoder, the other ends of the input of said first and second AND gates being respectively connected to the output terminal of said second D-type flip-flop, one input terminal (CK) of said second D-type flip-flop being connected to the other output of said address decoder, said first and second D-type flip-flops having a respective reset connected to each other and then connected to said trigger circuit, said trigger circuit being connected to power supply, the other input terminals (D) of said first and second D-type flip-flops being connected to the data bus of the slot of said TV game machine, the output of said OR gate being connected to the control pin (CE) of the ROM of said computer control main unit, said trigger circuit driving said first and second D-type flip-flops to reset when power supply is turned on, causing said first and fourth AND gates to do no work, said first and third AND gates and said OR gate to work, so as to let the microprocessor of said TV game machine enter the BIOS program of said ROM to execute the program.

4. The Computer control device for use with a TV game machine of claim 2 wherein said keyboard control circuit is for the connection of an IBM PC AT/XT compatible keyboard.

5. The computer control device for use with a TV game machine of claim 2 wherein said second ASIC comprises an address decoder & control port, a floppy diskdrive interface circuit, a hard diskdrive interface circuit, a printer interface circuit, a RS-232 interface circuit, a mouse interface circuit, and a clock generator OSC/CLK, the input of the interface circuits being respectively connected to the address output of said address decoder & control port, the clock generator OSC/CLK being connected to said floppy diskdrive interface circuit and said RS-232 interface circuit to provide.

6. The computer control device for use with a TV game machine of claim 5 wherein said RS-232 interface circuit is connected to a MODEM through a driver.

7. The computer control device for use with a TV game machine of claim 5 wherein said floppy diskdrive interface circuit is connected to a floppy diskdrive.

8. The computer control device for use with a TV game machine of claim 5 wherein said hard diskdrive interface circuit is connected to a hard diskdrive.

9. The computer control device for use with a TV game machine of claim 5 wherein said printer interface circuit is connected to a printer.

10. The computer control device for use with a TV game machine of claim 5 wherein said mouse interface circuit is connected to a mouse.

11. The computer control device for use with a TV game machine of claim 1 wherein the circuit of said TV game machine, the circuit of said computer control main unit, the keyboard and peripheral equipment are integrally connected together for the connection of external peripheral equipment.

12. A computer control device for use with a TV game machine, said computer control device comprising a computer control main unit for executing a BIOS program using a microprocessor of the TV game machine, said computer control main unit comprising:

means for storing said BIOS program;

means for connecting said computer control main unit to the game card slot of the TV game machine;

means for loading said BIOS program into a first memory region associated with the microprocessor of said TV game machine via the game card slot of said TV game machine; and means for directing said microprocessor to execute the BIOS program from said first memory region.

13. The computer control device of claim 12, wherein said computer control main unit further comprises:

means for transferring said BIOS program from an address associated with said first memory region to another address associated with a second memory region; and means for executing said BIOS program from said second memory region using internal components of the TV game machine.

14. The computer control device of claim 11, wherein said computer control main unit further comprises:

means for connecting said computer control main unit to at least one peripheral device; and means for allocating at least one memory address associated with the microprocessor to each peripheral device so that said microprocessor is capable of carrying out said BIOS using said peripheral devices.

15. The computer control device of claim 14, wherein said at least one peripheral device is a modem.

16. The computer control device of claim 11, wherein said means for connecting said computer control main unit to the game card slot of the TV game machine includes means for matching internal components of the TV game machine.

* * * * *